United States Patent
Loos et al.

(10) Patent No.: US 8,855,364 B2
(45) Date of Patent: Oct. 7, 2014

(54) APPARATUS FOR IDENTIFICATION OF AN OBJECT QUEUE, METHOD AND COMPUTER PROGRAM

(75) Inventors: Hartmut Loos, Hildesheim (DE); Julia Ebling, Hildesheim (DE); Christof Krueger, Munich (DE)

(73) Assignee: Robert Bosch GmbH, Stuttgart (DE)

( * ) Notice: Subject to any disclaimer, the term of this patent is extended or adjusted under 35 U.S.C. 154(b) by 319 days.

(21) Appl. No.: 13/391,356

(22) PCT Filed: Jul. 2, 2010

(86) PCT No.: PCT/EP2010/059434
§ 371 (c)(1),
(2), (4) Date: May 1, 2012

(87) PCT Pub. No.: WO2011/020641
PCT Pub. Date: Feb. 24, 2011

(65) Prior Publication Data
US 2012/0207350 A1 Aug. 16, 2012

(30) Foreign Application Priority Data

Aug. 18, 2009 (DE) .......................... 10 2009 028 604

(51) Int. Cl.
*G06K 9/00* (2006.01)
*H04N 5/225* (2006.01)

(52) U.S. Cl.
CPC .................................. *G06K 9/00778* (2013.01)
USPC .......................................... 382/103; 348/169

(58) Field of Classification Search
CPC .................................... G06K 1/00; G06K 9/00
USPC .......... 382/103, 107, 236; 348/169–172, 352; 707/799; 710/39, 54, 112, 263
See application file for complete search history.

(56) References Cited

U.S. PATENT DOCUMENTS 5,581,625 A * 12/1996 Connell ........................ 382/100
5,930,055 A * 7/1999 Eisenberg .................... 359/728
2009/0034846 A1 2/2009 Senior et al.

OTHER PUBLICATIONS

Zanin, "An Efficient Vehicle Queue Detection System Based on Image Processing," Proceedings of the 12th International Conference on Image Analysis and Processing, Sep. 2003, Retrieved from the Internet, Feb. 14, 2012 <URL: http://tev.fbk.eu/TeV/Publications/Zanin_Queue.pdf>.

(Continued)

*Primary Examiner* — Abolfazl Tabatabai
(74) *Attorney, Agent, or Firm* — Michael Best & Friedrich LLP

(57) ABSTRACT

In daily life, people are often forced to join a queue in order, for example, to pay at a checkout or to be dealt with at an airport, etc. Because of the various forms of a queue, these are not usually recorded automatically, but are analyzed manually. For example, if a long queue is formed at a supermarket, as a result of which the predicted waiting time for the customers rises above a threshold value, this situation can be identified by the checkout personnel, and a further checkout can be opened. A device 1 is proposed for identification of a queue 2 of objects 10 in a monitoring area, having an interface 6 which can be connected to an image source 7, with the interface 6 being designed to observe at least one monitoring image 3 of the monitoring area of the image source, wherein the monitoring image 3 shows a scene background of the monitoring area with possible objects 10, having an evaluation device 5 which is designed to identify the queue 2 of the objects 10 in the at least one monitoring image, wherein the evaluation device 5 has an object detector module 8 which is designed to detect a plurality of objects 10 on the basis of the monitoring image 3, wherein the plurality of the detected objects 10 forms the basis for identification of the queue 2 of the objects 10, wherein the object detector module 8 is designed to identify the objects 8 in the monitoring image with the scene background and/or wherein the object detector module 8 has content-sensitive detectors 9 for detection of the objects 10.

13 Claims, 3 Drawing Sheets

(56) References Cited

OTHER PUBLICATIONS

Hinz et al., "Car detection in aerial thermal images by global evidence accumulation," Pattern Recognition in Remote Sensing, Mar. 2006, pp. 308-315, vol. 27, issue 4, Elsevier.

Velastin et al., "Intelligent Distributed Video Surveillance Systems," 2006, The Institution of Electrical Engineers, IEE, London, XP002609569, ISBN: 9780863415043, pp. 209-224.

PCT/EP2010/059434 International Search Report dated Nov. 29, 2010 (Translation and Original, 6 pages).

* cited by examiner

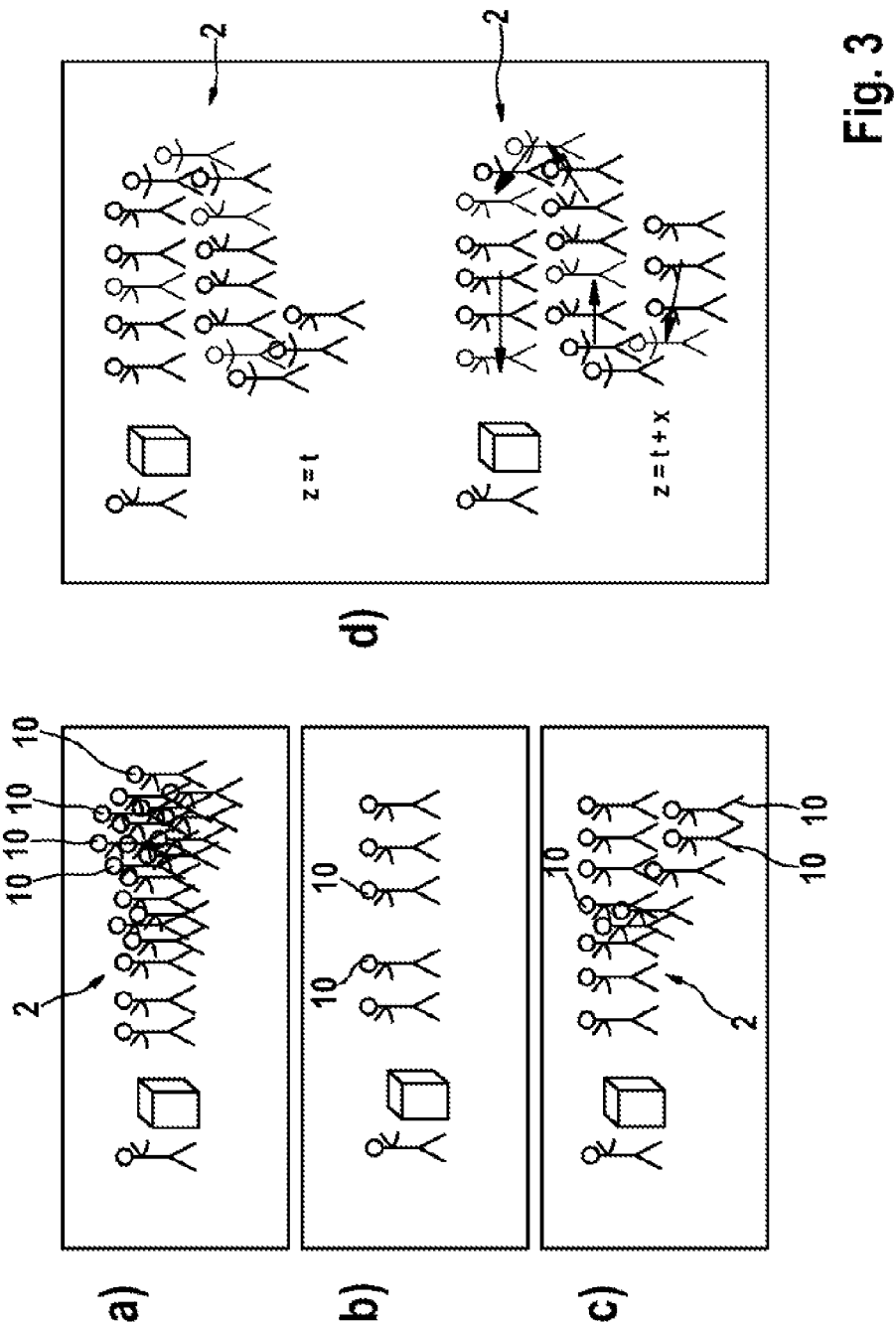

APPARATUS FOR IDENTIFICATION OF AN OBJECT QUEUE, METHOD AND COMPUTER PROGRAM

BACKGROUND OF THE INVENTION

The invention relates to an apparatus for identifying a queue of objects in a monitoring area, having an interface which can be connected to an image source, the interface being designed to accept at least one monitoring image of the monitoring area from the image source, the monitoring image showing a scene background of the monitoring area with possible objects, having an evaluation device which is designed to identify the queue of objects in the at least one monitoring image, the evaluation device having an object detector module which is designed to detect a multiplicity of the objects on the basis of the monitoring image, and the multiplicity of the detected objects forming the basis for identifying the queue of objects. The invention also relates to a corresponding method and a computer program.

In daily life, people are often forced to join a waiting queue in order to pay at a checkout, to be dealt with at the airport, etc., for example. Waiting queues occur in many kinds of scenarios and are formed when the arrival rate of objects exceeds the processing rate. The arrival rate of the objects is often unknown and varies with time. This likewise applies to the processing rate in many cases. Therefore, the length of the waiting queue is an unknown quantity which cannot be calculated but must be determined in another manner.

With a fixed processing rate, such as in the case of a ride in an amusement park, it is possible to predefine the shape of the queue by means of a barrier, the likely waiting time then being able to be determined with the aid of empirical methods. The likely waiting time can then be displayed to the person waiting using permanently fitted boards along the queue.

Another possibility for determining a waiting queue is provided if the waiting area has clearly defined entrances and exits, with the result that the number of objects in the waiting area can be determined, for example, using light barriers or turnstiles. However, no further statement on the shape and number of waiting queues can then be made inside the waiting area.

On account of the varying embodiments of a waiting queue, the latter is usually not detected in an automated manner but rather is usually analyzed manually. If, for example, a long queue forms in a supermarket, with the result that the likely waiting time for the customers rises above a threshold value, this circumstance can be ascertained by the checkout staff and a further checkout can be opened.

In the documentary prior art, the document U.S. Pat. No. 5,581,625 discloses a stereo camera system for counting objects in a queue. In the system, an item of depth information relating to the objects is acquired by the stereo camera in order to count the objects.

In contrast, the document U.S. Pat. No. 5,953,055, which probably forms the closest prior art, relates to a system and a method for detecting and analyzing queues. Said document proposes first of all subtracting a learnt background image from a monitoring image and classifying the remaining image pixels containing information as a queue.

SUMMARY OF THE INVENTION

Among other variations and embodiments, an apparatus for identifying a queue having the features of claim 1, a method having the features of claim 11 and a computer program having the features of claim 13 are proposed.

Preferred or advantageous embodiments will be apparent from the subclaims, the following description, and the accompanying figures.

An apparatus which is suitable and/or designed to identify a queue of objects in a monitoring area is proposed within the scope of the invention. A queue, preferably a waiting queue, of objects is understood as meaning an accumulation of these objects which is arranged in a straight line or a curved line, optionally additionally with a plurality of branches, intermediate gaps, accumulations and/or agglomerations. Therefore, the term queue is preferably understood as meaning any organized or quasi organized arrangement of the objects queuing at one or more destinations. The destination may be, for example, a checkout, an entrance, an exit or a functional area, for example a food counter, a vending machine, etc.

The apparatus preferably comprises a data processing device, which implements the identification functions, and has at least one interface which can be connected to an image source. The connection can be wired or wireless. The image source is preferably in the form of a monitoring camera, in particular a mono-image camera. This makes it possible to operate the apparatus in real time. Alternatively or additionally, the image source is in the form of an image memory which provides stored images. At least one monitoring image of the monitoring area can be passed to the apparatus via the interface, the monitoring image showing a scene background of the monitoring area with possible objects. The scene background of the monitoring area is formed by the naturally occurring background, for example a street, shelves in a shop, etc.

In order to identify the queue in the at least one monitoring image, the apparatus has an evaluation device. The evaluation device includes an object detector module which is designed to detect a multiplicity of the objects on the basis of the monitoring image, the multiplicity of the detected objects forming the basis for identifying the queue of objects. In one preferred embodiment of the invention, the objects are identified as separate objects or individual objects by the object detector module.

The object detector module is designed to identify the objects in the monitoring image with the scene background. Thus it is possible to dispense with the background subtraction, which is used in the prior art. The background subtraction is a critical step in prior-art image analysis since a static background is often ideally used as the starting point for analysis. However, the background is usually only quasi static in actuality. For example, the background image can be greatly influenced by an automobile driving past, a change in light or other disturbances. In contrast, it is advantageous if this error-prone step is dispensed with and the objects are immediately identified against the scene background in the monitoring image.

Alternatively or additionally, the object detector module has content-sensitive detectors for detecting the objects. Content-sensitive detectors are understood as meaning detectors which find the objects by analyzing the contents of the monitoring image. This procedure makes it possible to look for and detect the objects against the scene background in the monitoring image. However, it is also possible, purely in principle, to use these detectors in a preprocessed monitoring image in which the scene background has already been subtracted, as is known from the prior art.

The advantage of the invention can therefore be seen in the fact that the monitoring image can be analyzed in a different manner and thus in a manner which is less susceptible to faults with regard to the detectors and/or the missing background subtraction.

In one preferred implementation of the invention, the content-sensitive detector(s) is/are designed to use a multiplicity of comparison features and classification rules for the comparison features. The comparison features may be complex, with the result that the image or the shape of an arm, a leg, etc. is used as the comparison feature, for example. Alternatively or additionally, the comparison features may also be based on simple geometrical shapes, such as horizontal lines, vertical lines, round shapes for heads, etc. The literature discloses a multiplicity of features or feature systems for image processing which can accordingly be selected for the objects. The content-sensitive detector(s) also comprise(s) classification rules which combine the results of the comparison features in order to enable an overall statement "object found-not found". The classification rules may comprise analytical rules which are programmed in, for example. In this case, it is conceivable for plausibility checks to be used as a classification rule, for example the fact that any person only has a maximum of two arms, with the result that an object having more than two arms is rejected. Alternatively or additionally, the classification rules may also be learnt; a multiplicity of possibilities (for example boost methods, neural networks, etc.) are also known in this respect.

In particular, the content-sensitive detector(s) is/are designed to detect and locate individual objects, preferably even in the case of mutual or other concealment and/or covering.

Optionally, provision may additionally be made for the object detector module and/or the evaluation device to be designed to identify further events in connection with queues, for example falling over, obstacles, queue-jumping, arguments, etc.

In one possible development of the invention, the evaluation device has a modeling module which is designed to model the queue on the basis of the detected objects. Since the objects in the monitoring image were not only detected but also preferably located, the modeling module can model the queue. In particular, the modeling module is designed to model any desired curved and/or branched queue shapes. In principle, provision may be made for additional information, for example an end point of the queue, to be manually input as expert or a-priori knowledge. Alternatively or additionally, however, the modeling module operates without knowledge of the position or existence of the queue.

The modeling module particularly preferably has a multiplicity of waiting queue models which cover different versions of waiting queues. The modeling module is designed to place such a waiting queue model onto the multiplicity of objects and/or to adapt the model to the distribution of said objects. The waiting queue models can be distinguished by the profile (for example curved or straight), the number or existence of branches, accumulations, etc.

In one particularly preferred embodiment of the invention, the evaluation device is designed, in terms of programming and/or circuitry, to identify and/or form the queue on the basis of a single monitoring image. Advantages over the prior art, which requires at least two images, namely the monitoring image and the background image, to identify the queue, are shown in this embodiment.

One development of the invention may provide for the evaluation device to have a movement analysis module which analyzes movement information and provides it as additional information for identifying and/or verifying the queue. The evaluation device, in particular the modeling module, is designed to use the additional information to identify and/or verify the queue. The movement analysis module is designed, for example, to identify the direction of movement of the detected objects in the waiting queue and/or to detect the direction of movement of gaps between the objects. In this case, the propagation of the intermediate spaces to the end or destination of the waiting queue is examined, in particular. Alternatively or additionally, the flow of movement, in particular as an optical flow, can also be used as additional information in the monitoring scene.

In another possible embodiment of the invention, the object detector module is designed to detect an orientation of the objects as additional information. This additional information can also be used by the evaluation device and/or the modeling module to identify and/or verify the queue. In the case of people for example, it is possible to carry out facial recognition and/or skin/skin color recognition and in this manner derive the orientation of the people. The queue shape can be detected or modeled more easily from the orientation of the people since people very often look in the direction of the end, that is to say the destination or exit, of the queue. In the case of automobiles, it is possible, for example, to detect the radiator, the license plate and/or the windshield and to detect an orientation in this manner. Queue detection is especially facilitated in the case of automobiles, in particular, since they cannot turn around etc. in the waiting queue, like people, and the significance of the orientation is thus higher.

Another addition to the invention may provide for the evaluation device to have an environment module which is designed to accept and/or identify a basic level of the monitoring scene in the at least one monitoring area as additional information. As a result of the detected basic level, the localization of the objects can be improved and consequently the queue can be identified and/or verified in a simpler manner.

The possibility of a depth chart module which provides a depth chart as additional information relating to the monitoring scene or the monitoring area can also be considered to be an optional improvement, the evaluation device being designed to use the additional information to identify and/or verify the queue. For example, such a depth chart can be constructed from a stereo camera system or from other special sensors.

Another possibility for improving the significance involves the monitoring image or a further monitoring image being in the form of a thermal image, with the result that heat information, for example head/face/hands in the case of people and/or hood/exhaust in the case of automobiles, can be easily identified and this additional information can likewise be used to identify and/or verify the queue—for example by determining the orientation of the objects.

The invention also relates to a method and a computer program having the features, among others, of claims 11 and 13, respectively.

BRIEF DESCRIPTION OF THE DRAWINGS

Further features, advantages and effects of the invention emerge from the following description of preferred exemplary embodiments of the invention and the accompanying figures, in which:

FIGS. 3a-d show a highly schematic illustration of waiting queues in different situations for illustrating the method.

DETAILED DESCRIPTION

Figure 1:
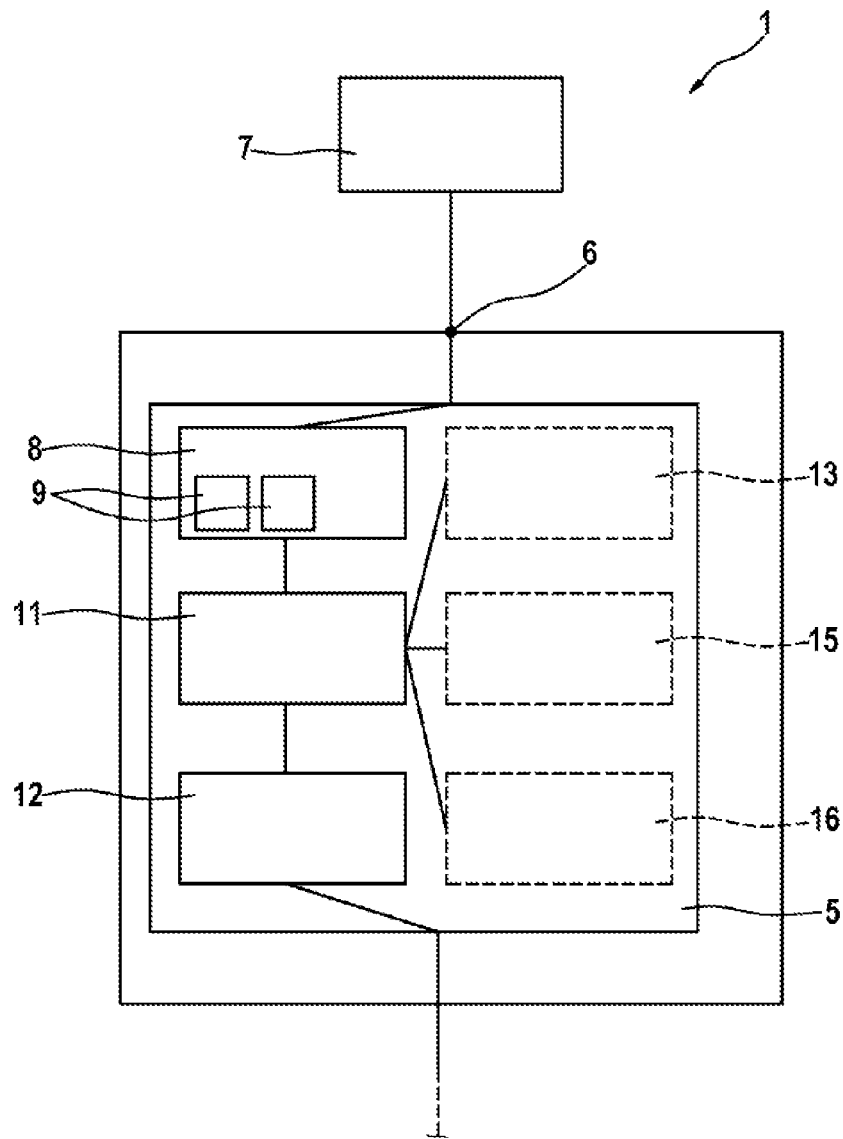
FIG. 1 shows a schematic block diagram of an apparatus for identifying a waiting queue as a first exemplary embodiment of the invention.

FIG. 1 shows a highly schematic illustration of an apparatus 1 for identifying a queue of objects in a monitoring area.

The apparatus 1 may be in the form of a personal computer or other digital processing unit and is used, in particular, to identify waiting queues of people.

Figure 2A:
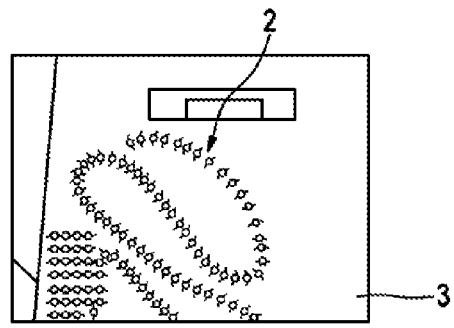
FIGS. 2a-c show a monitoring image for illustrating the method according to the invention.
Figure 2B:
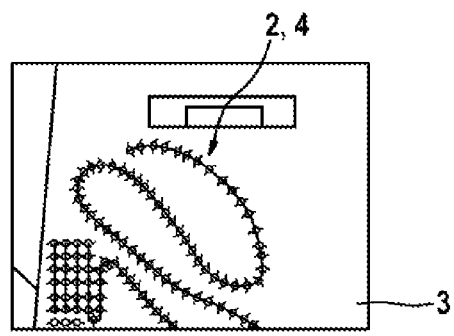

FIG. 2*a* shows, for example, a waiting queue 2 of individual people in a plan view from above in a monitoring image 3. The apparatus 1 makes it possible to identify the waiting queue 2, as visualized in FIG. 2*b* by the solid line 4 through the waiting queue 2.

The apparatus 1 may have an assessment module 12 which, after identifying the waiting queue 2, provides characteristic variables of the waiting queue 2, for example the length of the queue, the number of people waiting, the average waiting time, the profile of the queue, the number of objects/people in the waiting queue 2, etc.

The apparatus 1 comprises an evaluation device 5 and an interface 6 via which the evaluation device 5 is or can be connected to an image source 7. The image source 7 may be, for example, in the form of a monitoring camera which is directed toward the monitoring area. In particular, a monitoring camera, as is often already installed in supermarkets, etc., can be used as the image source 7, with the result that here no additional hardware costs for the monitoring camera arise when integrating the waiting queue identification system. Alternatively, the image source 7 may also be in the form of an image memory which provides stored monitoring images 3 which show the waiting queue 2 in a monitoring area.

After at least one of the monitoring images 3 has been passed to the evaluation device 5, the monitoring image 3 is examined by an object detector module 8 for search objects 10, for people in the case of FIG. 2. For this purpose, the object detector module has one or more detectors 9 which carry out content-sensitive object detection within the monitoring image 3. In particular, the detectors 9 are designed in such a manner that the search for the objects 10 can be carried out without a background subtraction, that is to say in the monitoring image 3 with a scene background (the square in this case). The detectors 9 look for the objects 10, for example by using a multiplicity of comparison features which are evaluated using classification rules. Such content-sensitive object detectors are known in image processing.

After some, a plurality of or all objects 10 have been identified in the monitoring image 3, the information relating to the objects 10 is passed to a modeling module 11. The modeling module 11 is designed to merge the existence and the distribution of the objects 10 in the monitoring image 3 with models of waiting queues, with the result that a waiting queue is modeled on the basis of the identification of the objects 10. In this case, the prepared models are designed for all queue shapes: straight, curved, branched, with gaps, with agglomerations, etc. The models may be predefined as analytical models, for example in the form of functions, or else as shapes.

After the waiting queue has been identified and/or modeled in the modeling module 11, the data relating to the waiting queue 2 are forwarded to the result module 12 which analyzes the waiting queue 2 with respect to the number of people waiting, the waiting time, etc. and outputs these characteristic variables of the waiting queue 2.

The described apparatus 1 can be used, for example, in supermarkets, at ticket counters, etc. in order to open further checkouts or counters in an automated manner if a predefined queue length or waiting duration is exceeded. It is also possible for the marketing department to use information relating to the detected queue shape to place products or advertisements in the waiting areas which have been determined.

In the basic form illustrated, it is possible to already identify a waiting queue 2 by analyzing a single monitoring image 3.

Figure 2C:
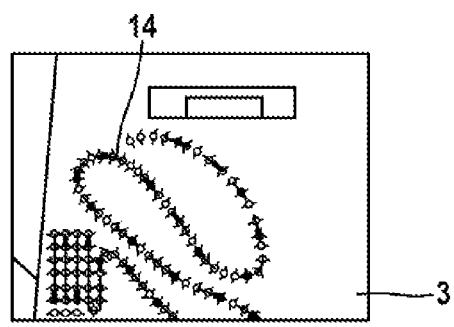

Adding further functional modules makes it possible to improve the detection accuracy of the apparatus 1. These further functional modules are additional options which do not appear to be absolutely necessary:

A movement analysis module 13 is designed to determine movement information from the monitoring image 3 or from at least two monitoring images 3 as an item of additional information:

For example, movement patterns of the waiting queue 2 can be identified by analyzing the movement of the objects 10 themselves or by analyzing the optical flow in the monitoring image 3. It is possible to detect the movement of the objects 10 in the queue 2, as schematically indicated in FIG. 2*c* by means of arrows 14. Alternatively or additionally, the intermediate spaces between the objects 10 may be observed and their propagation to the end of the waiting queue 2 can be analyzed. The direction of movement of the objects 10, of the intermediate spaces or of the optical flow results in a clear indication of the shape of the waiting queue 2.

An environment module 15 is designed to identify a basic level of the observed scene or to acquire it by means of a user input. Knowledge of the basic level of the observed scene makes it possible to assign a 3D model to the latter, with the result that the positions of the objects 10 can be defined more accurately. This basic level is also an item of additional information.

The precise position of the objects 10 can be obtained as a further item of additional information in a depth chart module 16 which uses, as an input, the images from a stereo camera or special sensors, for example.

Further possibilities for obtaining additional information are the use of infrared cameras in order to identify, for example, heat information relating to the head, face and hands in the case of people or the hood/exhaust in the case of automobiles as objects. This heat information can be used to improve the detection of the objects 10 or to detect an orientation of the objects 10. This information is also additional information.

Said additional information is used individually or together or in any desired selection in the modeling module 11 in order to improve the modeling of the waiting queue 2. In order to improve the modeling, it is additionally or alternatively also possible for a user to explicitly state the shape or destination of a waiting queue to be expected.

FIGS. 3*a*-*d* illustrate different situations of a waiting queue 2 in order to illustrate a selection of different versions of the waiting queue 2. According to FIG. 3*a*, people as objects 10 may conglomerate in a waiting queue 2. According to FIG. 3*b*, gaps may occur between the people as objects 10. These gaps may also be used to identify the direction of movement of the waiting queue 2. Furthermore, as shown in FIG. 3*c*, divisions or branches of the objects 10 within the queue 2 may occur.

FIG. 3*d* illustrates the possibility of the evaluation of the orientation of the people 10 in the queue 2 and their direction of movement, illustrated by arrows, being able to help with the identification of the waiting queue 2. The direction of movement is determined, for example, by comparing a monitoring image 3 at a time $z=t$ and a monitoring image 3 at a time $z=t+x$, in particular by tracking an object. The determination can be carried out, for example, by the movement analysis module 13. The orientation of the objects 10 can be directly detected using special sensors, for example thermal imaging cameras. Alternatively or additionally, the orientation can also be effected by the object detector module 8. The direction of movement and/or orientation of the objects 10 can be used as additional information in the modeling module 11 for identifying the waiting queue 2.

The invention claimed is:

1. An apparatus for identifying a queue of objects in a monitoring area, the apparatus having an interface which can be connected to an image source, the interface being designed to accept at least one monitoring image of the monitoring area from the image source, the monitoring image showing a scene background of the monitoring area with possible objects, and an evaluation device which is designed to identify the queue of objects in the at least one monitoring image, the evaluation device having an object detector module which is designed to detect a multiplicity of the objects on the basis of the monitoring image, the multiplicity of the detected objects forming the basis for identifying the queue of objects, wherein the object detector module is designed to identify the objects in the monitoring image with the scene background, the object detector module has content-sensitive detectors for detecting the objects, or both.

2. The apparatus as claimed in claim 1, wherein the content-sensitive detectors comprise a multiplicity of comparison features and classification rules for the comparison features.

3. The apparatus as claimed in claim 1, wherein the evaluation device has a modeling module which is designed to model the queue on the basis of the detected objects.

4. The apparatus as claimed in claim 3, wherein the modeling module is designed to place a predefined waiting queue model onto the multiplicity of objects.

5. The apparatus as claimed in claim 1, wherein the evaluation device is designed to identify the queue on the basis of a single monitoring image.

6. The apparatus as claimed in claim 1, wherein the evaluation device has a movement analysis module which is designed to detect the direction of movement of the detected objects and/or the direction of movement of gaps between the objects, and/or the flow of movement in the monitoring image as additional information on the basis of at least two monitoring images, or a combination thereof, the evaluation device being designed to use the additional information to identify the queue.

7. The apparatus as claimed in claim 1, wherein the object detector module is designed to detect an orientation of the objects as additional information, the evaluation device being designed to use the additional information to identify the queue.

8. The apparatus as claimed in claim 1, wherein the evaluation device has an environment module which is designed to identify a basic level of the monitoring image in the at least one monitoring area as additional information, the evaluation device being designed to use the additional information to identify the queue.

9. The apparatus as claimed in claim 1, wherein the evaluation device has a depth chart module which is designed to identify a depth chart as additional information, the evaluation device being designed to use the additional information to identify the queue.

10. The apparatus as claimed in claim 1, wherein the at least one monitoring image or a further monitoring image is in the form of a thermal image.

11. A method for identifying a queue of objects in a monitoring area, at least one monitoring image of the monitoring area being passed from an image source to an evaluation device, the monitoring image showing a scene background of the monitoring area with possible objects, the evaluation device identifying the queue of objects in the at least one monitoring image, an object detector module of the evaluation device detecting a multiplicity of the objects on the basis of the monitoring image, the multiplicity of the detected objects forming the basis for identifying the queue of objects, wherein the object detector module identifies the objects in the monitoring image with the scene background, the object detector module identifies the objects using content-sensitive detectors, or both.

12. The method as claimed in claim 11, characterized by the use of the apparatus as claimed in claim 1.

13. A non-transitory computer-readable storage medium storing a computer program having program code for carrying out all of the steps of the method as claimed in claim 11 when the program is executed on a computer.

\* \* \* \* \*